(12) United States Patent
Sjolund et al.

(10) Patent No.: US 10,136,615 B2
(45) Date of Patent: Nov. 27, 2018

(54) MILKING STALL

(71) Applicant: DELAVAL HOLDING AB, Tumba (SE)

(72) Inventors: Helene Sjolund, Tumba (SE); Magnus Larsson, Tumba (SE); Mikael Fagervall, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 466 days.

(21) Appl. No.: 14/785,633

(22) PCT Filed: May 20, 2014

(86) PCT No.: PCT/SE2014/050616
§ 371 (c)(1),
(2) Date: Oct. 20, 2015

(87) PCT Pub. No.: WO2014/189449
PCT Pub. Date: Nov. 27, 2014

(65) Prior Publication Data
US 2016/0057972 A1    Mar. 3, 2016

(30) Foreign Application Priority Data

May 21, 2013    (SE) ..................................... 1350619

(51) Int. Cl.
*A01K 1/12*    (2006.01)
*A01K 1/00*    (2006.01)

(52) U.S. Cl.
CPC .............. *A01K 1/12* (2013.01); *A01K 1/0023* (2013.01)

(58) Field of Classification Search
CPC ...... A01K 1/0023; A01K 1/12; A01K 1/0029; A01K 1/0017; A01K 1/0613
See application file for complete search history.

(56) References Cited

U.S. PATENT DOCUMENTS 4,336,768 A * 6/1982 Wagner ................ A01K 1/0023
                                                  119/840
4,432,305 A * 2/1984 Vernese ............... A01K 1/0613
                                                  119/752
4,559,904 A * 12/1985 Harmsen .............. A01K 1/0209
                                                  119/51.02

(Continued)

FOREIGN PATENT DOCUMENTS

EA          009146 B1    10/2007
EA          014493 B1    12/2010

(Continued)

OTHER PUBLICATIONS

International—Type Search Report, dated Nov. 15, 2013, from corresponding PCT application.

(Continued)

*Primary Examiner* — Joshua D Huson
(74) *Attorney, Agent, or Firm* — Young & Thompson

(57) ABSTRACT

A milking stall that houses one animal at a time. The milking stall includes a fence arrangement defining an interior space of the milking stall and made up of i) a stationary first long side, ii) a second long side extending along the first long side and having a central fence portion supporting a first entrance gate and a first exit gate, iii) a first short side attached to the first long side as a second entrance gate (5), and iv) a second short side attached to the first long side as a second exit gate.

20 Claims, 4 Drawing Sheets

(56) References Cited

U.S. PATENT DOCUMENTS

| | | | | |
|---|---|---|---|---|
| 4,590,886 | A | * | 5/1986 | Brashear .................. A61D 3/00 |
| | | | | 119/519 |
| 5,704,311 | A | | 1/1998 | Van Den Berg |
| 6,079,360 | A | * | 6/2000 | Birk .......................... A01K 1/12 |
| | | | | 119/14.09 |
| 6,186,093 | B1 | * | 2/2001 | Finn .......................... A01K 1/00 |
| | | | | 119/14.03 |
| 6,357,395 | B1 | * | 3/2002 | Nilsson ................ A01K 1/0017 |
| | | | | 119/524 |
| 6,427,632 | B1 | * | 8/2002 | Horst ................... A01K 1/0017 |
| | | | | 119/518 |
| 8,074,600 | B2 | | 12/2011 | Kallen et al. |
| 2004/0244696 | A1 | * | 12/2004 | Woolford .............. A01J 5/0175 |
| | | | | 119/14.03 |
| 2008/0017118 | A1 | | 1/2008 | Wigholm et al. |
| 2011/0036305 | A1 | * | 2/2011 | Gipson ................. A01K 1/0023 |
| | | | | 119/843 |
| 2014/0299061 | A1 | * | 10/2014 | Larsson ............... A01K 1/0017 |
| | | | | 119/14.03 |

FOREIGN PATENT DOCUMENTS

| | | |
|---|---|---|
| EP | 0 188 303 A1 | 7/1986 |
| EP | 0 191 517 A1 | 8/1986 |
| EP | 0 451 906 A1 | 10/1991 |
| EP | 0 634 097 A1 | 1/1995 |
| EP | 1 316 253 A2 | 6/2003 |
| RU | 2 185 053 C2 | 7/2002 |
| SE | 9901859 L | 10/2000 |
| SU | 1158119 A | 5/1985 |
| WO | 00/70934 A1 | 11/2000 |
| WO | 2006/133717 A2 | 12/2006 |
| WO | 2011/102717 A1 | 8/2011 |

OTHER PUBLICATIONS

International Search Report, dated Sep. 17, 2014, from corresponding PCT application.
Supplementary International Search Report, dated Aug. 28, 2015, from corresponding PCT application.

* cited by examiner

MILKING STALL

BACKGROUND OF THE INVENTION AND PRIOR ART

The present invention relates to a milking stall arranged to house one animal at a time, wherein the milking stall comprises a fence arrangement defining the space of the milking stall, wherein the fence arrangement comprises a first long side which comprises a first entrance gate and a first exit gate and a second long side formed by a stationary fence section.

Milking stalls for voluntary milking of animals are many times defined by a fence arrangement or the like comprising two long sides and two short sides. The teat cups may be attached to an animal in a voluntary milking stall by means of a robot arm via an opening in one of the long sides of the milking stall. The opposite long side of the milking stall may comprise an entrance gate used by the animals when they enter the milking stall, a stationary intermediate portion and an exit gate used by the animals when they leave the milking stall.

Due to the fact that a milking stall has a certain size and the cows in a herd have different sizes, there is a risk that small cows are able to move around in the milking stall. It can be difficult for a robot arm to attach the teat cups to the teats of a milking cow which does not stand still in the milking stall. Furthermore, when a cow can move around in a milking stall there is an increased risk that the milk tubes and pulse tubes get entangled and the teat cups come loose from the teats of the cow.

WO 2011/102717 shows a milking box for cows comprising two long sides and two short sides. A first long side is formed by a first entrance fence and a first exit fence and an opposite long side is formed by a second entrance fence and a second exit fence. The short sides of the milking box are formed by a respective stationary wall element.

SUMMARY OF THE INVENTION

The object of the present invention is to provide a milking stall allowing animal traffic in different directions to and from the milking stall at the same time as it is easy to attach teat cups to an animal in the milking stall. A further object of the invention is to provide a milking stall having capacity to position and hold an animal in a desired position in the milking stall. A further object of the invention, it is to provide a milking stall which has capacity to motivate an animal to leave the milking stall when it is time.

The initially mentioned object is achieved according to the invention by the feature that that the fence arrangement comprises a first short side formed by a second entrance gate and a second short side formed by second exit gate. Such a placed second entrance gate makes it possible for an animal to walk straight ahead into the milking stall. In a corresponding manner such a placed second exit gate makes it possible for an animal to walk straight ahead out of the milking stall when the milking process has been finished. Components arranged at the rear short side of the milking stall such as a manure splash guard and at the front short side such as a feeding trough may be movably arranged to a position in which they do not constitute an obstacle for an animal entering or leaving the milking stall. Such components may, for example, be mounted on the respective movable gates. In this case, it is possible to provide four different flows of animals through the milking stall. An animal may enter the milking stall via the first entrance gate or the second entrance gate and leave the milking stall via the first exit gate or the second exit gate. In this case, it is possible to control the animal traffic both to and from the milking stall. Since the second long side of the fence arrangement is stationary, it is easy to attach the teat cups from a position outside the second long side of the fence arrangement. The teat cups are here attached to the teats of an animal via the large space between a front leg and a rear leg of an animal. Such an attachment of the teat cups from the side of an animal is relatively easy to perform. The milking stall comprises a robot arm configured to attach teat cups to an animals in the milking stall, wherein the robot arm is mounted in a position at the outside of the second long side of the fence arrangement. In this position, it is possible for the robot arm to use the space between a front leg and a rear leg when it attaches teat cups to the teats an animal in the milking stall. The stationary fence section which forms the second long side may be provided with an opening of a suitable size which is used by the robot when it attaches the teat cups to the animal in the milking stall. A teat cup magazine may also be arranged in a position at the outside of the second long side of the fence arrangement. Such a milking stall may be a voluntary milking stall.

According to a preferred embodiment of the invention, the first entrance gate is positionable in an open position in which it allows an animal in a first entrance area to enter the milking stall and in a closed position in which it prevents an animal in the first entrance area to enter the milking stall. It is here possible to control the animal flow from the first entrance area to the milking stall by means of the first entrance gate. The second entrance gate may be positionable in an open position in which it allows an animal in a second entrance area to enter the milking stall and in a closed position in which it prevents an animal in the second entrance area to enter the milking stall. It is here possible to control the animal flow from the second entrance area to the milking stall by means of the second entrance gate. The first entrance area and the second entrance area constitute two alternative entrance passages for the animals to use when they like to be milked. If one of the entrance areas is blocked for any reason, the animals in the other entrance area are able to enter the milking stall. The risk that the animal traffic to the milking stall will be completely blocked is substantially minimised. The first entrance area and the second entrance area may be closed areas for animals which have reached the milking permission criteria. The animals may have access to the closed entrance areas via gates or the like.

According to a preferred embodiment of the invention, the first exit gate is positionable in an open position in which it allows an animal to enter a first exit area when it leaves the milking stall and in a closed position in which it prevents an animal to leave the milking stall and enter the first exit area. It is here possible to control the animal flow from the milking stall to the first exit area by means of the first exit gate. The second exit gate may be positionable in an open position in which it allows an animal to enter a second exit area when it leaves the milking stall and in a closed position in which it prevents an animal to leave the milking stall and enter the second exit area. It is here possible to control the animal flow from the milking stall to the second exit area by means of the second exit gate. The first exit area and the second exit area may be two separate areas. They may, for example, be a roughage feeding area, a concentrate feeding area or an area for treatment of unhealthy animals.

According to a preferred embodiment of the invention, at least one of the second entrance gate and the second exit gate is positionable in an adjusted closed position in which they limit the longitudinal space in the milking stall in order to position an animal in a desired longitudinal position in the milking stall. The second entrance gate may be moved to an adjusted closed position in which it defines a desired longitudinal position of a rear portion of the animal in the milking stall. The second exit gate may be moved to an adjusted closed position in which it defines a desired longitudinal position of a front portion of the animal in the milking stall. The animal may here be positioned in an optimal longitudinal position for attachment of teat cups to the animal.

According to a preferred embodiment of the invention, at least one of the first entrance gate and the first exit gate are positionable in an adjusted closed position in which they limit transverse space in the milking stall in order to position an animal in a desired transverse position in the milking stall. The first entrance gate may be moved to an adjusted closed position in which it defines a desired transverse position for a rear side portion of the animal in the milking stall. The second exit gate may be moved to an adjusted closed position in which it defines a desired transverse position for a front side portion of the animal in the milking stall. The animal may here be positioned in an optimal transverse position for attachment of teat cups to the animal.

According to a preferred embodiment of the invention, at least one of the entrance gates is configured to be moved towards a rear portion of a cow in the milking stall and push the cow forwardly when it is time to leave the milking parlour. Some animals do not leave the milking stall when a milking process has been finished and the exit gate has been open. In order to motivate such animals to leave the milking stall in time, the entrance gates are here used to push the animal forwardly towards the open exit gate.

According to a preferred embodiment of the invention, the first entrance gate and the second entrance gate comprise each a first end portion pivotally arranged around a vertical axis and a free end portion located at a distance from the first end portion. The entrance gates are pivotally arranged at a distance from each other. The second entrance gate may be pivotally arranged around a vertical axis at a rear portion of the first long side of the fence arrangement. The first entrance gate may be pivotally arranged around a vertical axis at the second long side of the fence arrangement.

According to a preferred embodiment of the invention, the first entrance gate and the second entrance gate have a design such that they are able to move through each other. The distance between the pivot axes of the entrance gates is usually of a size such that the free end portions of the entrance gates risk to come in contact with each other. In this case, one of the entrance gates may block the pivot movement of the other entrance gate. Since the entrance gates have a design such they are able to move through each other they do not block each other. The entrance gates may comprise a number of horizontal members having a free end portion and an opposite end portion fixedly attached to a vertical post of the entrance gates. The entrance gates comprise empty spaces between the horizontal bars. Each horizontal member of the first entrance gate is arranged at the same height level as an empty space of the second entrance gate. Each horizontal member of the second entrance gate is arranged at the same height level as an empty space of the first entrance gate. With such a design, it is possible to move the entrance gates through each other.

According to a preferred embodiment of the invention, the first exit gate and the second exit gate comprise each a first end portion pivotally arranged around a vertical axis and a free end portion located at a distance from the first end portion. The exit gates are pivotally arranged at a distance from each other. The second exit gate may be pivotally arranged around a vertical axis at a front portion of the first long side of the fence arrangement. The first exit gate may be pivotally arranged around a vertical axis at the second long side of the fence arrangement.

According to a preferred embodiment of the invention, the first exit gate and the second exit gate have a design such that they are able to move through each other. The distance between the pivot axes of the exit gates is usually of a size such that the free end portions of the exit gates risk to come in contact with each other. In this case, one of the exit gates may block the pivot movement of the other exit gate. Since the exit gates have a design such they are able to move through each other they do not block each other. The exit gates may comprise a number of horizontal members having a free end portion and an opposite end portion fixedly attached to a vertical post of the entrance gate. The exit gates comprise empty spaces between the horizontal bars. Each horizontal member of the first exit gate is arranged at the same height level as an empty space of the second exit gate. Each horizontal member of the second exit gate is arranged at the same height level as an empty space of the first exit gate. With such a design, it is possible to move the exit gates through each other.

According to a preferred embodiment of the invention, the milking stall comprises a control unit configured to control the movements of the gates. The control unit decides if the animal in the first entrance area or an animal in the second entrance area will be given access to the milking stall. The control unit also decides if an animal in the milking stall will be directed to the first exit area or the second exit area. The control unit may receive information from identifying sensors or the like about the identity of the animal in the first entrance area and the second entrance area. The control unit may give one of the animals access to the milking stall in view of stored data about the individual animals. The control unit may also direct the animals in the milking stall to one of the exit areas in view of stored data about the individual animals. The control unit may also move the gates to adjusted closed positions in which they position and hold an animal in a desired longitudinal and transverse position in the milking stall.

According to a preferred embodiment of the invention, the milking stall comprises extensible power members configured to perform the movements of said gates. The extensible power members may be hydraulic or pneumatic cylinders. One end of the extensible power members are attached to a respective gate and the other end of the extensible power member is attached to a suitable stationary element in the milking stall.

According to a preferred embodiment of the invention, the first long side comprises a stationary fence portion arranged between the first entrance gate and the first exit gate. Such a stationary portion may stabilize the fence arrangement and provide a support for the first entrance gate and the first exit gate.

BRIEF DESCRIPTION OF THE DRAWINGS

In the following, a preferred embodiment of the invention is described by an example and with reference to the attached drawings, in which.

BRIEF DESCRIPTION OF A PREFERRED EMBODIMENT OF THE INVENTION

Figure 1:
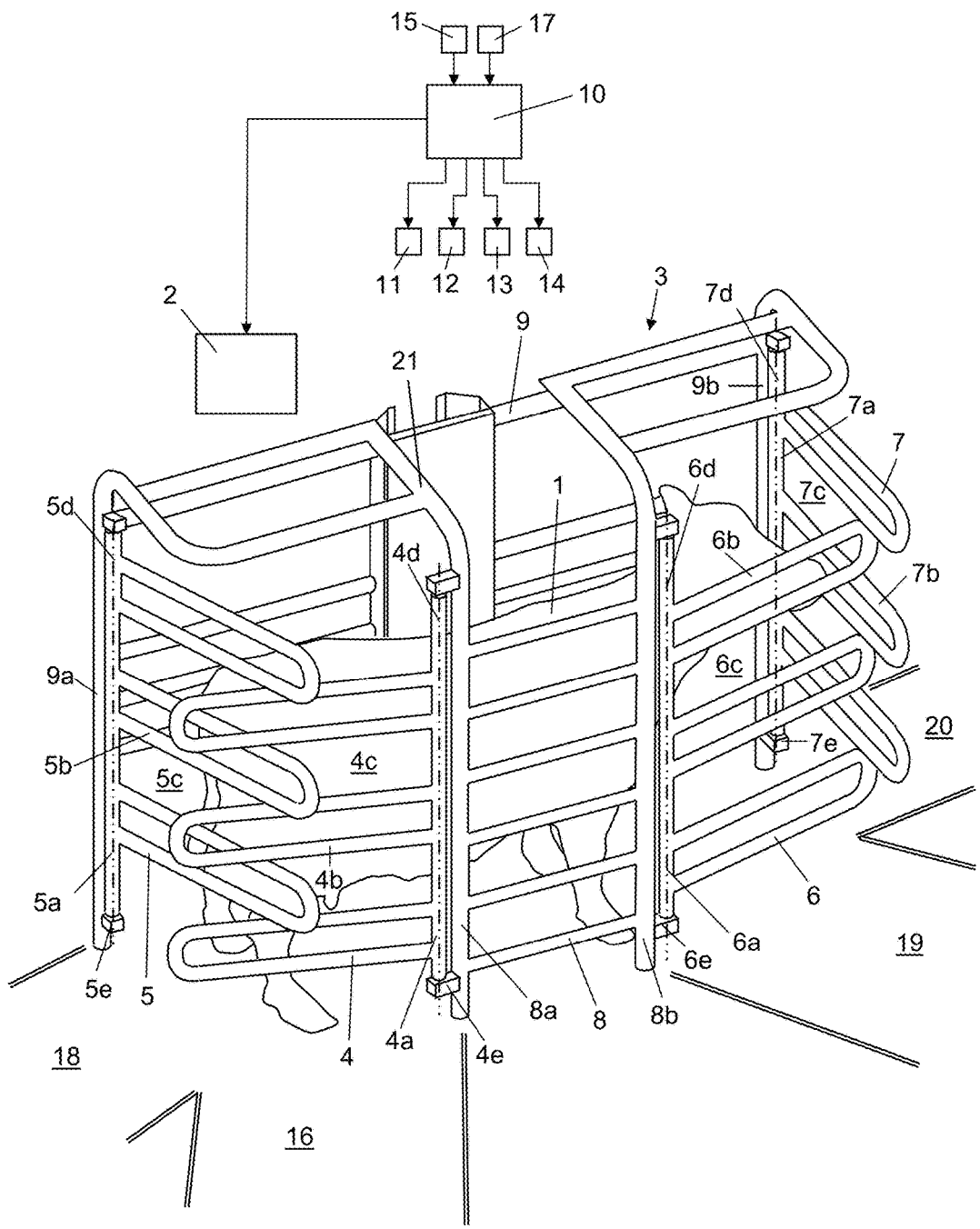
FIG. 1 shows a perspective view of a milking stall according to the invention.

FIG. 1 shows a milking stall for voluntary milking of cows 1. The milking stall comprises a schematically disclosed robot arm 2 configured to attach teat cups to the teats of a cow 1 in the milking stall. The milking stall comprises a fence arrangement 3 limiting the space of the milking stall. The fence arrangement 3 comprises a right long side, a left long side, a rear short side and a front short side. The fence sections are here named in view of the nearest portion of a cow 1 standing in a milking position in the milking stall. The right long side of the fence arrangement comprises a first entrance gate 4 forming a rear portion of the right long side, a first exit gate 6 forming a front portion of the right long side and a stationary fence portion 8 arranged between the first entrance gate 4 and the first exit gate 6. The rear short side of the fence arrangement comprises a second entrance gate 5. The front short side of the fence arrangement comprises a second exit gate 7. The left long side of the fence arrangement is formed by a stationary fence section 9. The milking stall comprises a roof portion 21 connecting the stationary fence portion 8 with stationary fence section 9. Thus, the roof portion 21, the stationary fence portion 8 and the stationary fence section 9 constitutes a stationary unit. The robot arm 2 is arranged in a position outside the stationary fence section 9.

The first entrance gate 4 comprises a vertical tubular post 4a and a number of horizontal members in the form of U-shaped tubular members 4b having a substantially horizontal extension between a free end and an end fixedly connected to the vertical post 4a. The horizontal members 4b are connected to the vertical post 4a at different height levels with intermittent empty spaces 4c. The vertical post 4a is rotatably arranged around a vertical axis 4d by means of two mounting units 4e. The mounting units 4e are fixedly connected to a rear vertical post 8a of the stationary fence portion 8.

The second entrance gate 5 comprises a vertical tubular post 5a and a number of horizontal member in the form of U-shaped tubular members 5b having a horizontal extension between a free end and an end fixedly connected to the vertical post 5a. The horizontal members 5b are connected to the vertical post 5a at different height levels with intermittent empty spaces 5c. The vertical post 5a is rotatably arranged around a vertical axis 5d by means of two mounting units 5e. The mounting units 5e are fixedly connected to a rear vertical post 9a of the stationary fence section 9.

Each U-shaped tubular member 4b of the first entrance gate 4 is arranged at the same height level as an empty space 5c of the second entrance gate 5. Each U-shaped tubular member 5b of the second entrance gate 5 is arranged at the same height level as an empty space 4c of the first entrance gate 4. With such a design of the entrance gates 4, 5, it is possible to move the entrance gates 4, 5 through each other, which is shown in FIG. 1.

The first exit gate 6 comprises a vertical tubular post 6a and a number of horizontal member in the form of U-shaped tubular members 6b having a horizontal extension between a free end and an end fixedly connected to the vertical post 6a. The horizontal members 6b are connected to the vertical post 6a at different height levels with intermittent empty spaces 6c. The vertical post 6a is rotatably arranged around a vertical axis 6d by means of two mounting units 6e. The mounting units 6e are fixedly connected to a front vertical post 8b of the intermediate fence portion 8.

The second exit gate 7 comprises a vertical tubular post 7a and a number of horizontal member in the form of U-shaped tubular members 7b having a horizontal extension between a free end and an end fixedly connected to the vertical post 7a. The horizontal members 7b are connected to the vertical post 7a at different height levels with intermittent empty spaces 7c. The vertical post 7a is rotatably arranged around a vertical axis 7d by means of two mounting units 7e. The mounting units 7e are fixedly connected to a front vertical post 9b of the stationary fence section 9.

Each U-shaped tubular member 6b of the first exit gate 6 is arranged at the same height level as an empty space 5c of the second entrance gate 5. Each U-shaped tubular member 5b of the second entrance gate 5 is arranged at the same height level as an empty space 4c of the first entrance gate 4. With such a design of the exit gates 6, 7, it is possible to move the exit gates 6, 7 through each other, which is shown in FIG. 1.

A control unit 10 controls the robot arm 2 and the motions of the gates 4, 5, 6, 7 by means of a respective extensible power member 11, 12, 13, 14 which are schematically indicated in FIG. 1. The control unit 10 receives information from a first identification device 15 about the identity of a cow 1 in a first entrance area 16 located in front of the first entrance gate 4. The control unit 10 receives information from a second identification device 17 about the identity of a cow 1 in a second entrance area 18 located in front of the second entrance gate 5. The first entrance area 16 and the second entrance area are separate areas which are marked with double solid lines in the figures. The separate areas 16, 18 may be closed areas defined by fences or the like. The cows may obtain access to the closed entrance areas 16, 18 via a respective gate or the like which is not visible in the drawings. Each entrance area 16, 18 has only space for one cow 1 in a front position. The control unit 10 directs a cow in the milking stall to a first exit area 19 or a second exit area 20. The first exit area 19 and the second exit area 20 are separate areas which are marked with double solid lines in the figures. The separate areas 19, 20 may be roughage feeding area, a concentrate feeding area, an area for treatment of unhealthy cows etc.

FIG. 2-7 shows the milking stall at different stages. The extensible power members 11, 12, 13, 14 are here indicated more in detail. A first power member 11 has one end connected to an upper portion of the first entrance gate 4 and an opposite end connected to an element of the stationary roof portion 21. A second power member 12 has one end connected to an upper portion of the second entrance gate 5 and an opposite end connected to an element of the roof portion 21. A third power member 13 has one end connected to an upper portion of the first exit gate 6 and an opposite end connected to an element of the roof portion 21. A fourth power member 14 has one end connected to an upper portion of the second entry gate 7 and an opposite end connected to an element of the roof portion 21. The extensible power members 11-14 are arranged at a height level above a cow 1 in the milking stall. The extensible power members 11-14 may be hydraulic or pneumatic cylinders. The control unit 10 controls the position of the gates 4-7 by means of the extensible power members 11-14.

Figure 2:
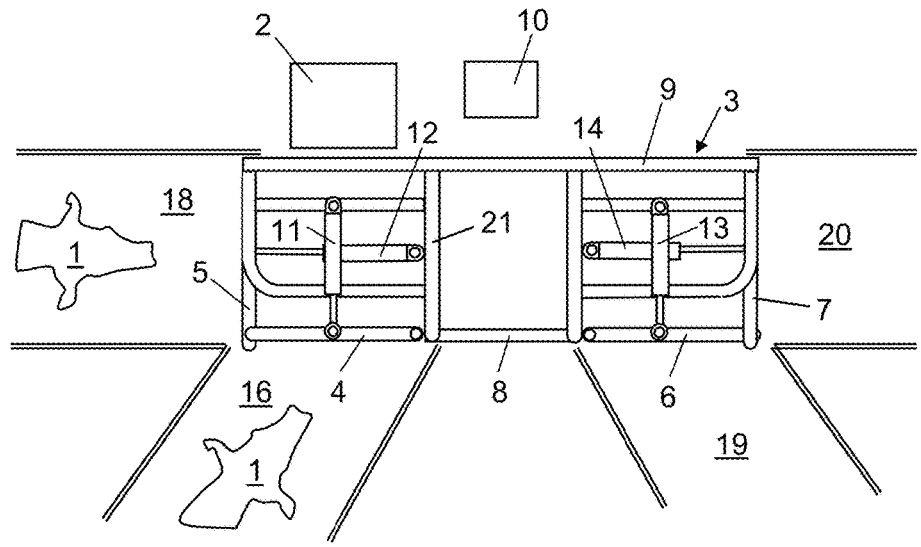
FIG. 2 shows a vacant milking stall according to the invention.

FIG. 2 shows a vacant milking stall. All gates 4, 5, 6, 7 are in a closed position. The first entrance gate 4 prevents a cow 1 in the first entrance area 16 to enter the milking stall and the second entrance gate 5 prevents a cow 1 in the second entrance area 18 to enter the milking stall. The control unit 10 receives information from the identification sensors 15, 17 about the identity of the cows 1 in the respective entrance areas 16, 18. In this case, the control unit 10 has decided to allow the cow 1 in the first entrance area 16 to enter the milking stall. Such a decision may be based on many factors. When the milking stall is ready to receive a cow 1, the control unit 10 activates the first power member 11 such that it moves the first entrance gate 4 to an open position such that a free passage is exposed between the first entrance area 16 and the milking stall.

Figure 3:
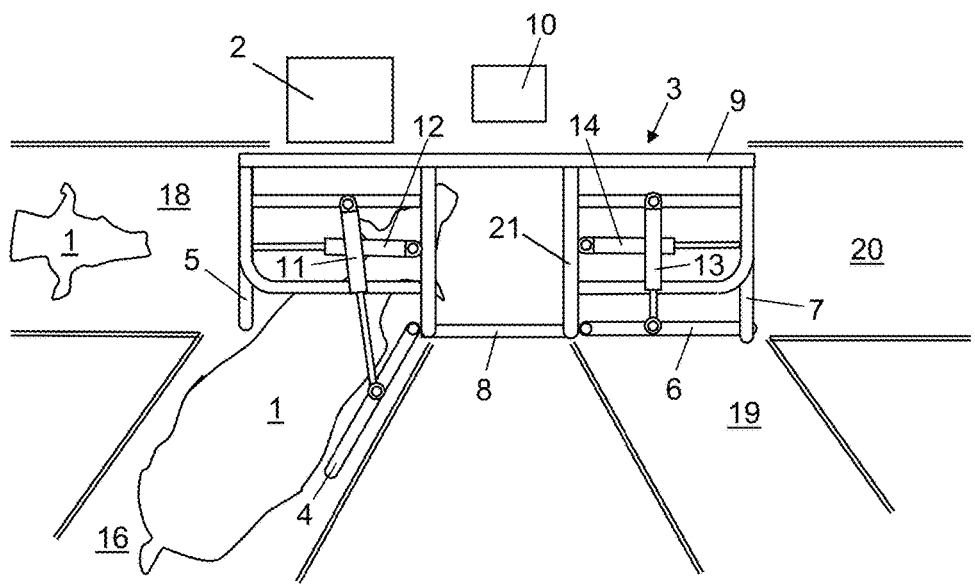
FIG. 3 shows an animal entering the milking stall from a first entrance area.
Figure 4:
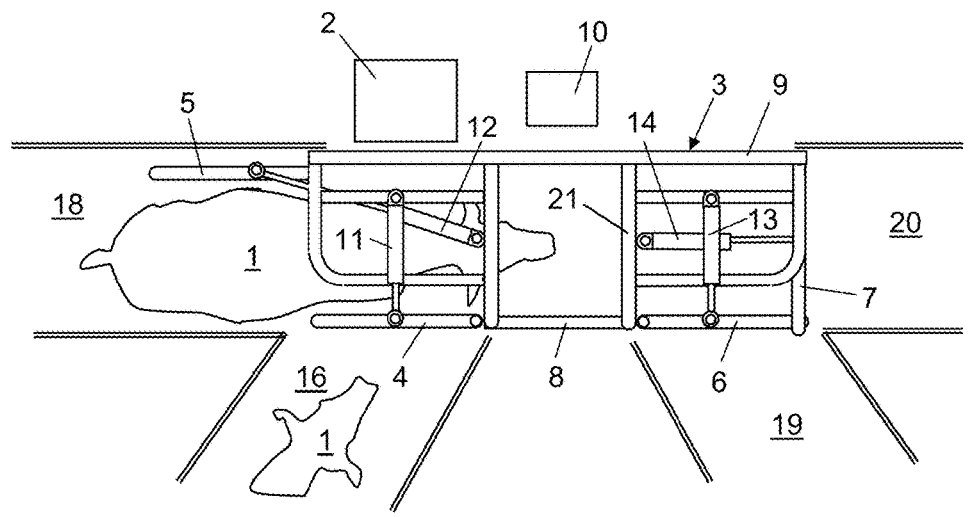
FIG. 4 shows an animal entering the milking from a second entrance area.

The cow 1 in the first entrance area 16 enters the milking stall in FIG. 3. The cow 1 walks diagonally forward into the milking stall. The control unit 10 keeps the second entrance gate 5 in the closed position by means of the second power member 12 such that the cow 1 in the second entrance area 18 is prevented to enter the milking stall.

If instead the control unit 10 has decided to allow the cow 1 in the second entrance area 18 to enter the milking stall, the control unit 10 activates the second power member 11 such that it moves the second entrance gate 4 from the closed position to an open position such that a free passage is exposed between the second entrance area 18 and the milking stall. The cow 1 in the second entrance area 16 walks straight forward when it enters the milking stall in FIG. 4. The control unit 10 keeps the first entrance gate 4 in the closed position by means of the first power member 11 such that the cow 1 in the first entrance area 16 is prevented to enter the milking stall.

When a cow 1 has entered the milking stall, all gates 4, 5, 6, 7 are initially set in the closed positions shown in FIG. 1. Thereafter, the control unit 10 activates the first power member 11 and the third power member 13 such they the move the first entrance gate 4 and the first exit gate 6 towards the right side of the cow 1. The control unit moves the first entrance gate 4 and the first exit gate 6 to an adjusted closed position in which they position the cow 1 in a desired transverse position in the milking stall in contact with the stationary fence section 9. The control unit 10 also activates the second power member 12 and the fourth power member 14 such they the move the second entrance gate 5 and the second exit gate 7 towards the rear portion and the front portion of the cow 1. The control unit 10 moves the second entrance gate 5 and the second exit gate 7 to an adjusted closed position in which they position the cow in a desired longitudinal position in the milking stall. The control unit 10 may have access to data about the length and the width of individual cows 1 which are milked in the milking stall in order to perform an individual lateral positioning and longitudinal positioning of the cow 1 in the milking stall.

Figure 5:
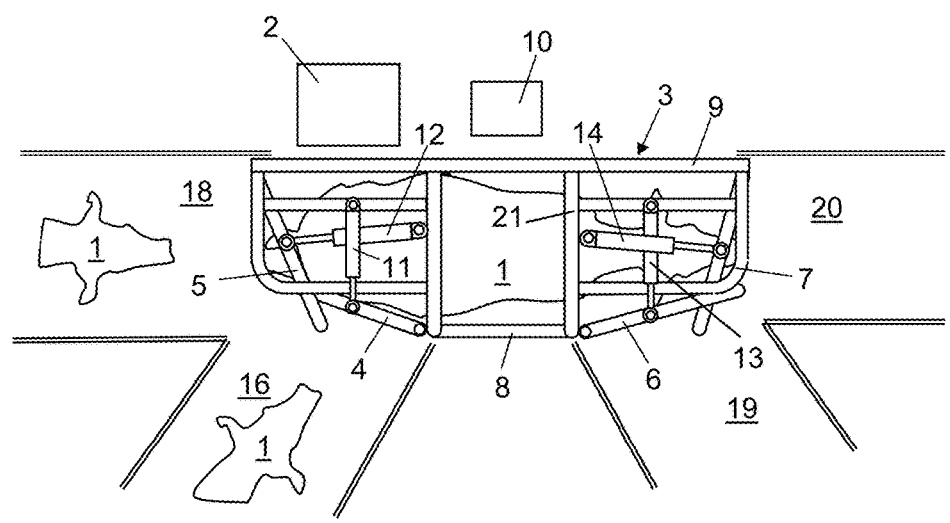
FIG. 5 shows an animal in a milking position in the milking stall.
Figure 6:
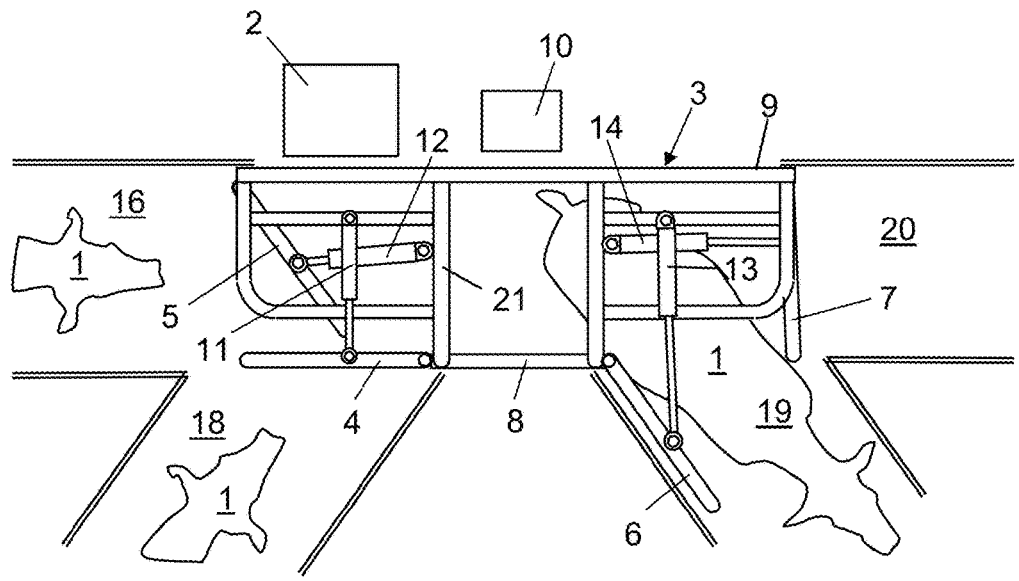
FIG. 6 shows an animal leaving the milking stall and entering a first exit area and FIG. 7 shows an animal leaving the milking stall and entering a second exit area state.
Figure 7:
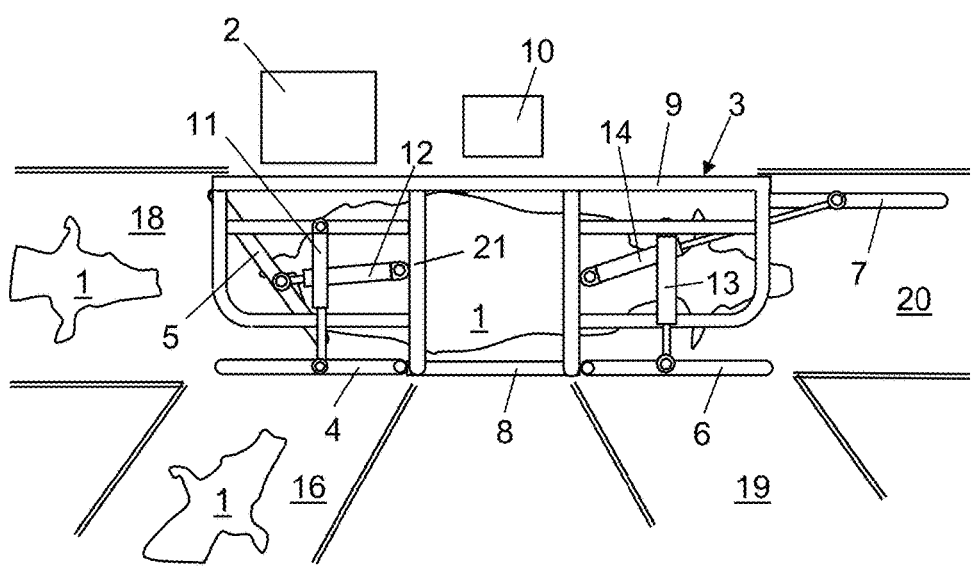

FIG. 5 shows the gates 4, 5, 6, 7 in an adjusted closed position in which they hold the cow 1 in a desired fixed position in relation to the robot arm 2 in order to facilitate the attaching process of the teat cups to the cow 1. The gates 4, 5, 6, 7 may hold the cow 1 in the desired fixed position during the whole milking process. In this case, there is no risk that the milk tubes and pulse tubes get entangled and the teat cups come loose from the teats of the cow 1 depending on movements of the cow 1 in a milking stall. In this case, all cows in a herd can be positioned in a desired fixed position in the milking stall regardless of the size of the cow 1.

The control unit 10 determines if the cow 1 has to enter the first exit area 20 or the second exit area 21 before the milking process has been finished. In this case, the control unit 10 has decided that the cow has to enter the first exit area 19 when it leaves the milking stall. When it is time for the cow 1 to leave the milking stall, the control unit 10 activates the fourth power member 14 such it at least moves the second exit gate 7 to the initially closed position and the third power member 13 such it moves the first exit gate 6 to an open position in which a free passage is exposed between the milking stall and the first exit area 19. It is now possible for the cow 1 to leave the milking stall and enter the first exit area 19. The cow 1 walks diagonally forward out from the milking stall to the first exit area 19.

In case the cow 1 does not leave the milking stall immediately, the control unit 10 activates at least one of the power cylinders 11, 12 such they provide a motion of the entrance gates 4, 5 towards an end portion of the cow 1. Such a pushing motion from behind motivates the cow 1 to leave the milking stall. When the cow 1 has left the milking stall, the control unit 10 activates the power members 11, 12, 13, 14 such that they moves all gates 4, 5, 6, 7 back to the initial closed positions. The milking stall is now ready to receive a new cow 1 from one of the entrance areas 16, 18.

In case, the control unit 10 decides that the cow instead has to enter the second exit area 20, it activates the fourth power member 14 such that it moves the second exit gate 7 to an open position such that a free passage is exposed between the milking stall and the second exit area 20. It is now possible for the cow 1 to walk straight ahead and enter the second exit area 20. In case the cow 1 does not leave the milking stall immediately, the control unit 10 activates at least one of the power cylinders 11, 12 such they provide a motion of at least one of the entrance gates 4, 5 towards the end portion of the cow 1. Such a pushing motion by the entrance gates 4, 5 motivates the cow 1 to leave the milking stall. When the cow 1 has left the milking stall, the control unit 10 activates the power members 11, 12, 13, 14 such that they move all gates 4, 5, 6, 7 to the initial closed positions. The milking stall is now ready to receive a new cow 1.

The above described milking stall makes it possible to provide alternative flow of cows to and from the milking stall. This may be an advantage by several reasons. If a cow from the first entrance areas 16, for example, does not enter the milking stall within a predetermined time after the first entrance gate has been open, the first entrance gate will be closed and the second entrance gate is open. In this case, stop in the cow traffic to the milking stall may be avoided. One of said areas 16, 18 may be used for cows which are to be milked with priority. If there is a cow in the priority entrance area, the control unit 10 will prioritize on opening of this entrance gate when the milking stall is vacant. The two alternative exit areas make it possible to provide an individually controlled cow flow to different areas. It is also possible to use the milking stall for two separate herds of cows without mixing the cows.

The invention is not limited to the described embodiments but may be varied and modified freely within the scope of the claims.

The invention claimed is:

1. A milking stall that houses one animal (1) at a time, comprising:
 a fence arrangement (3) defining an interior space of the milking stall and being comprised of i) a stationary first long side (9) extending in a longitudinal first direction between a first terminal end and an opposite, second terminal end, ii) a second long side spaced apart from the first long side (9) and extending in the first direction on a first side of the first long side (9), the second long side being comprised of a) a central fence portion (8) with a first terminal end and an opposite, second terminal end, b) a first entrance gate (4) pivotably attached to a first terminal end of the central fence portion (8), and c) a first exit gate (6) pivotably attached to a second terminal end of the central fence portion (8), a first entrance area (16) being located adjacent the first entrance gate (4) and a first exit area being located adjacent the first exit gate (6), iii) a first short side (5) having a first terminal end and an opposite, second terminal end, the first terminal end of the first short side being pivotably attached to the first terminal end of the first long side as a second entrance gate (5), a second entrance area (18) being located adjacent the second entrance gate, the first short side being shorter than the first and second long sides, and iv) a second short side (7) having a first terminal end and an opposite, second terminal end, the first terminal end of the second short side being pivotably attached to the second terminal end of the first long side as a second exit gate (7), a second exit area (20) being located adjacent the second exit gate (7), the second short side being shorter than the first and second long sides; and a robot arm (2) that attaches teat cups to an animal located within the interior space of the milking stall, the robot arm (2) being mounted outside of the fence arrangement, at a second side of the first long side (9), wherein in a first closed position, a) a second terminal end of the first entrance gate (4) is located at the second terminal end of the first short side (5), and b) a second terminal end of the first exit gate (6) is located at the second terminal end of the second short side (7), thereby defining the fence arrangement (3) as a first closed space with a first overall area, and wherein in an adjusted, second closed position, the second terminal end of the first entrance gate (4) overlaps through the second terminal end of the first short side (5) thereby reducing the first overall area of the first closed space.

2. The milking stall according to claim 1, wherein the first entrance gate (4) is positionable i) in an open position that allows the animal in the first entrance area (16) to enter the milking stall, and ii) in a closed position that prevents the animal in the first entrance area (16) from entering the milking stall.

3. The milking stall according to claim 2, wherein the second entrance gate (5) is positionable i) in an open position that allows the animal in the second entrance area (18) to enter the milking stall, and ii) in a closed position that prevents the animal in the second entrance area (18) from entering the milking stall.

4. The milking stall according to claim 3, wherein the first exit gate (4) is positionable i) in an open position that allows the animal to enter the first exit area (19) to leave the milking stall, and ii) in a closed position that prevents the animal from leaving the milking stall and entering the first exit area (19).

5. The milking stall according to claim 4, wherein the second exit gate (7) is positionable i) in an open position that allows the animal to enter the second exit area (20) to leave the milking stall, and ii) in a closed position that prevents the animal from leaving the milking stall and entering the second exit area (20).

6. The milking stall according to claim 1, wherein in an adjusted, third closed position a) the second terminal end of the first entrance gate (4) overlaps through the second terminal end of the first short side (5), and b) the second terminal end of the first exit gate (6) overlaps through the second terminal end of the second short side (7), thereby reducing a longitudinal length and a transverse width of the first closed space and defining a second closed space of a second overall area.

7. The milking stall according to claim 1, further comprising a control unit operatively connected to control operation of the robot arm, movement of the first and second entrance gates, and movement of the first and second exit gates, wherein the control unit is configured to move at least one of the first and second entrance gates (4, 5) into the first closed space towards a rear portion of the animal in the milking stall to thereby push the animal forward within the milking stall.

8. The milking stall according to claim 1, further comprising a control unit operatively connected to control the robot arm, movement of the first and second entrance gates, and movement of the first and second exit gates, wherein the control unit is configured to selectively move each the first and second entrance gates (4, 5) into the first closed space thereby reducing the first overall area of the first closed space.

9. The milking stall according to claim 8, wherein the first entrance gate (4) and the second entrance gate (5) are pivotable to move through each other.

10. The milking stall according to claim 1, further comprising a control unit operatively connected to control operation of the robot arm, movement of the first and second entrance gates, and movement of the first and second exit gates, wherein the control unit is configured to selectively move at least one of the first and second exit gates (6, 7) into the first closed space thereby reducing the first overall area of the first closed space.

11. The milking stall according to claim 1, further comprising:

a control unit operatively connected to control operation of the robot arm, movement of the first and second entrance gates, and movement of the first and second exit gates; and extensible power members (11, 12, 13, 14) operatively connected to the control unit, to each of the first and second entrance gates, and to each of the first and second exit gates, the extensible power members (11, 12, 13, 14) being configured to perform, under direction of the control unit, movements of said first and second entrance gates and movement of said first and second exit gates.

12. The milking stall according to claim 1, wherein the central fence portion (8) is stationary.

13. The milking stall according to claim 1, further comprising a roof portion (21) extending from the stationary first long side (9) to the central fence portion (8).

14. The milking stall according to claim 1, further comprising a roof portion extending from the first terminal end and the second terminal end of the stationary first long side (9) to the central fence portion (8).

15. The milking stall according to claim 1, wherein, the first entrance gate (4) and the second entrance gate (5) are pivotable to move through each other, and the first exit gate (6) and the second entrance gate (7) are pivotable to move through each other.

16. A milking stall that houses one animal (1) at a time, comprising:
   a fence arrangement (3) defining an interior space of the milking stall and being comprised of
   i) a stationary first long side (9) extending in a longitudinal first direction between a first terminal end and an opposite, second terminal end,
   ii) a second long side spaced apart from the first long side (9) and extending in the first direction on a first side of the first long side (9), the second long side being comprised of a) a central fence portion (8) with a first terminal end and an opposite, second terminal end, b) a first entrance gate (4) pivotably attached to a first terminal end of the central fence portion (8), and c) a first exit gate (6) pivotably attached to a second terminal end of the central fence portion (8), a first entrance area (16) being located adjacent the first entrance gate (4) and a first exit area being located adjacent the first exit gate (6),
   iii) a first short side (5) having a first terminal end and an opposite, second terminal end, the first terminal end of the first short side being pivotably attached to the first terminal end of the first long side as a second entrance gate (5), a second entrance area (18) being located adjacent the second entrance gate, the first short side being shorter than the first and second long sides, and
   iv) a second short side (7) having a first terminal end and an opposite, second terminal end, the first terminal end of the second short side being pivotably attached to the second terminal end of the first long side as a second exit gate (7), a second exit area (20) being located adjacent the second exit gate (7), the second short side being shorter than the first and second long sides;
   a robot arm (2) that attaches teat cups to an animal located within the interior space of the milking stall, the robot arm (2) being mounted outside of the fence arrangement, at a second side of the first long side (9),
   wherein in a first closed position, a) a second terminal end of the first entrance gate (4) is located at the second terminal end of the first short side (5), and b) a second terminal end of the first exit gate (6) is located at the second terminal end of the second short side (7), thereby defining the fence arrangement (3) as a first closed space with a first overall area; and
   a control unit operatively connected to control operation of the robot arm, movement of the first and second entrance gates, and movement of the first and second exit gates, wherein the control unit is configured to move at least one of the first and second exit gates (6, 7) into the first closed space towards a front portion of the animal in the milking stall to thereby push the animal rearward within the milking stall.

17. The milking stall according to claim 16, wherein the first exit gate (6) and the second entrance gate (7) are pivotable to move through each other.

18. The milking stall according to claim 16, wherein, the first entrance gate (4) and the second entrance gate (5) are pivotable to move through each other, and
the first exit gate (6) and the second entrance gate (7) are pivotable to move through each other.

19. The milking stall according to claim 16, wherein the control unit is configured to selectively move each of the first and second exit gates (6, 7) into the first closed space thereby reducing the first overall area of the first closed space.

20. A milking stall that houses one animal (1) at a time, comprising:
   a fence arrangement (3) defining an interior space of the milking stall and being comprised of
   i) a stationary first long side (9) extending in a longitudinal first direction between a first terminal end and an opposite, second terminal end,
   ii) a second long side spaced apart from the first long side (9) and extending in the first direction on a first side of the first long side (9), the second long side being comprised of a) a central fence portion (8) with a first terminal end and an opposite, second terminal end, b) a first entrance gate (4) pivotably attached to a first terminal end of the central fence portion (8), and c) a first exit gate (6) pivotably attached to a second terminal end of the central fence portion (8), a first entrance area (16) being located adjacent the first entrance gate (4) and a first exit area being located adjacent the first exit gate (6),
   iii) a first short side (5) having a first terminal end and an opposite, second terminal end, the first terminal end of the first short side being pivotably attached to the first terminal end of the first long side as a second entrance gate (5), a second entrance area (18) being located adjacent the second entrance gate, the first short side being shorter than the first and second long sides, and
   iv) a second short side (7) having a first terminal end and an opposite, second terminal end, the first terminal end of the second short side being pivotably attached to the second terminal end of the first long side as a second exit gate (7), a second exit area (20) being located adjacent the second exit gate (7), the second short side being shorter than the first and second long sides; and
   a robot arm (2) that attaches teat cups to an animal located within the interior space of the milking stall, the robot arm (2) being mounted outside of the fence arrangement, at a second side of the first long side (9),
   wherein in a first closed position, a) a second terminal end of the first entrance gate (4) is located at the second terminal end of the first short side (5), and b) a second terminal end of the first exit gate (6) is located at the second terminal end of the second short side (7), thereby defining the fence arrangement (3) as a first closed space with a first overall area,
   wherein the first entrance gate (4) and the second entrance gate (5) are pivotable to move through each other, and
   wherein the first exit gate (6) and the second entrance gate (7) are pivotable to move through each other.

* * * * *